US009611789B2

(12) United States Patent
Mitrovic et al.

(10) Patent No.: US 9,611,789 B2
(45) Date of Patent: Apr. 4, 2017

(54) REDUCTION GEARBOX FOR A GAS TURBINE ENGINE

(71) Applicant: PRATT & WHITNEY CANADA CORP., Longueuil (CA)

(72) Inventors: Lazar Mitrovic, Longueuil (CA); Keith Morgan, Westmount (CA); Danny Mills, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 180 days.

(21) Appl. No.: 14/670,551

(22) Filed: Mar. 27, 2015

(65) Prior Publication Data

US 2016/0281609 A1    Sep. 29, 2016

(51) Int. Cl.
| | |
|---|---|
| F02C 3/107 | (2006.01) |
| F02C 7/36 | (2006.01) |
| F02K 3/02 | (2006.01) |
| F02C 3/10 | (2006.01) |
| F16H 1/22 | (2006.01) |
| F02C 7/32 | (2006.01) |
| F16H 37/04 | (2006.01) |

(52) U.S. Cl.
CPC ............... *F02C 7/36* (2013.01); *F02C 3/10* (2013.01); *F02C 3/107* (2013.01); *F02C 7/32* (2013.01); *F02K 3/025* (2013.01); *F16H 1/22* (2013.01); F05D 2220/325 (2013.01); F05D 2250/313 (2013.01); F05D 2260/4031 (2013.01); F16H 1/222 (2013.01); F16H 37/041 (2013.01)

(58) Field of Classification Search
CPC .................................. F02C 3/107; F02C 7/36
See application file for complete search history.

(56) References Cited

U.S. PATENT DOCUMENTS

| | | | |
|---|---|---|---|
| 2,613,749 A | 10/1952 | Price | |
| 2,619,797 A | 12/1952 | Haworth | |
| 4,270,408 A * | 6/1981 | Wagner | F02C 6/02 74/402 |

(Continued)

FOREIGN PATENT DOCUMENTS

| | | |
|---|---|---|
| FR | 543901 | 9/1922 |
| FR | 1189941 | 10/1959 |
| RU | 2532089 | 10/2014 |

OTHER PUBLICATIONS

International Search Report and Written Opinion, International Application No. PCT/CA2016/050329, May 25, 2016.

(Continued)

*Primary Examiner* — Tisha Lewis
(74) *Attorney, Agent, or Firm* — Norton Rose Fulbright Canada LLP

(57) ABSTRACT

The described reduction gearbox of a gas turbine engine includes a first gear reduction stage having an input gear adapted to be driven by a turbine output shaft. The input gear transfers power received from the turbine output shaft laterally away from the input gear to an input speed gear. Each input speed gear engages an output speed gear to define a main speed reduction gear set, and the main speed reduction gear sets are laterally spaced apart from one another to define a gap. The gearbox has a second gear reduction stage driven by the output speed gears, the second stage adapted to drive an engine output shaft.

20 Claims, 7 Drawing Sheets

(56) References Cited

U.S. PATENT DOCUMENTS

| | | | |
|---|---|---|---|
| 6,973,783 B1 * | 12/2005 | Hauser | F04B 1/324 |
| | | | 60/484 |
| 7,144,349 B2 | 12/2006 | Mitrovic | |
| 8,015,900 B2 | 9/2011 | Gmirya | |
| 8,397,603 B2 | 3/2013 | Gmirya | |
| 8,683,892 B2 | 4/2014 | Gmirya | |
| 9,010,105 B1 * | 4/2015 | Bennett | B60K 17/28 |
| | | | 60/486 |
| 2003/0115885 A1 | 6/2003 | MacFarlane et al. | |
| 2012/0117982 A1 * | 5/2012 | Suciu | F02C 7/32 |
| | | | 60/802 |
| 2014/0020506 A1 | 1/2014 | Duong | |

OTHER PUBLICATIONS

European Search Report, EP Application No. 16162598.3, Aug. 2, 2016.

\* cited by examiner

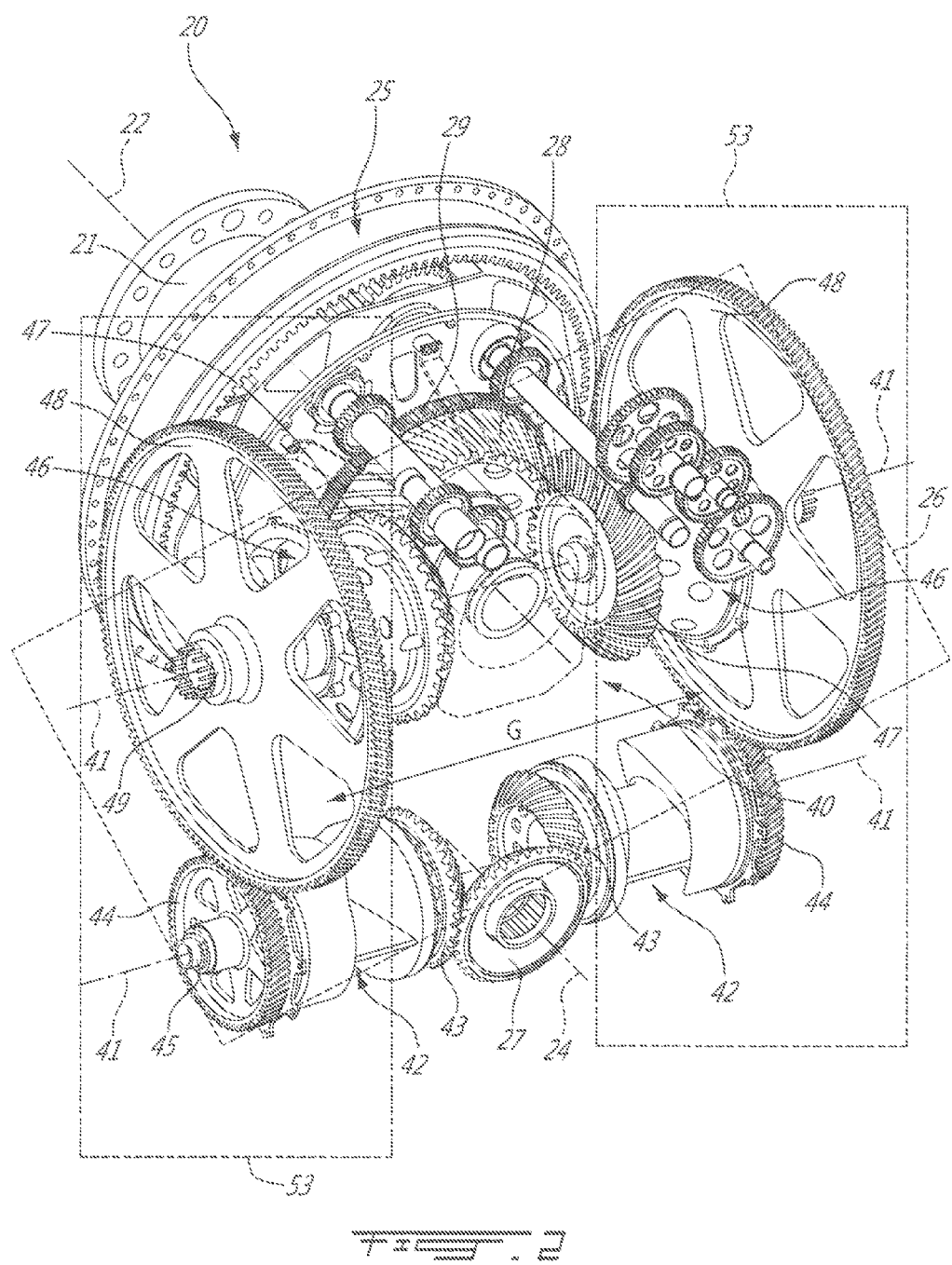

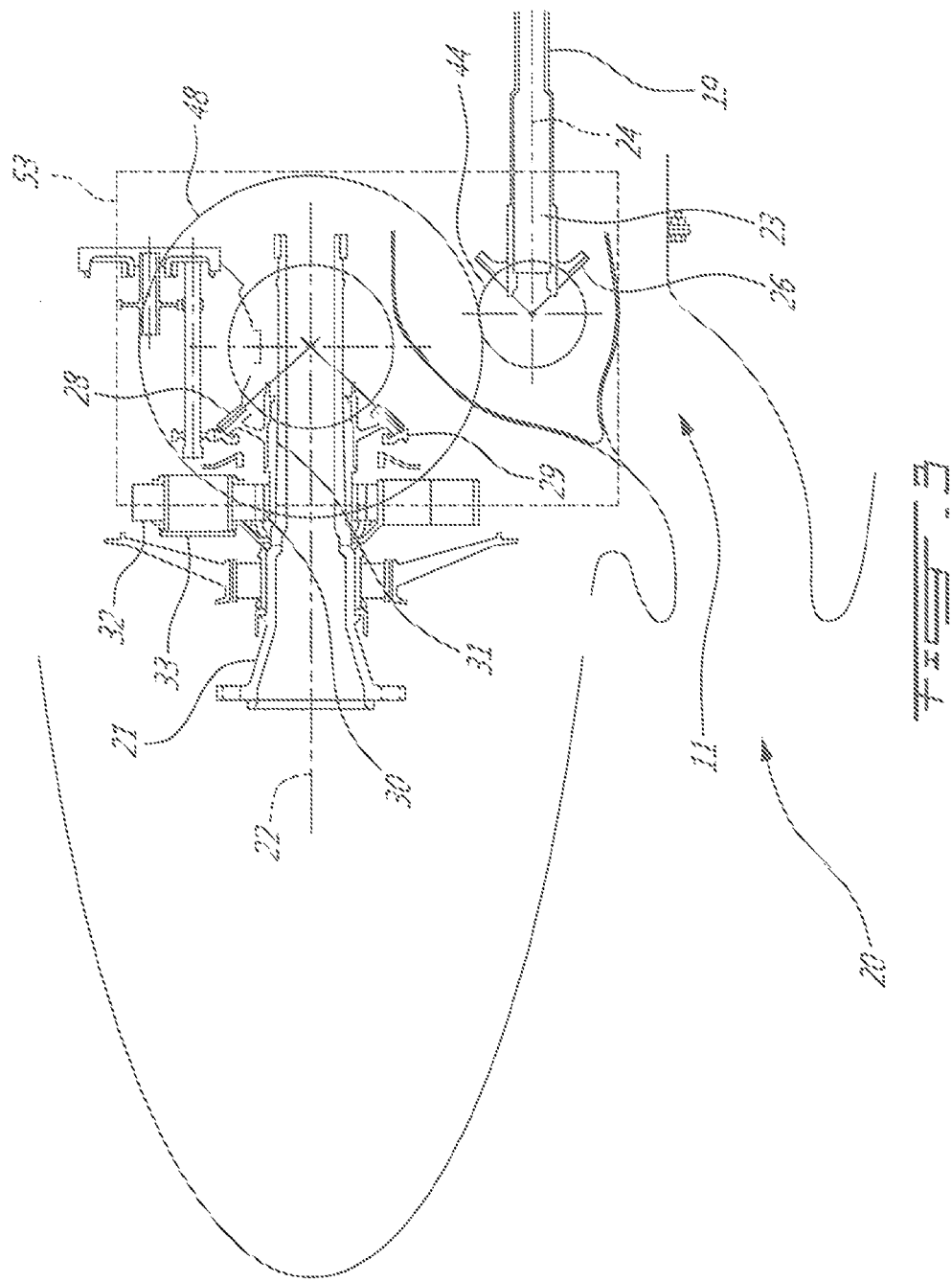

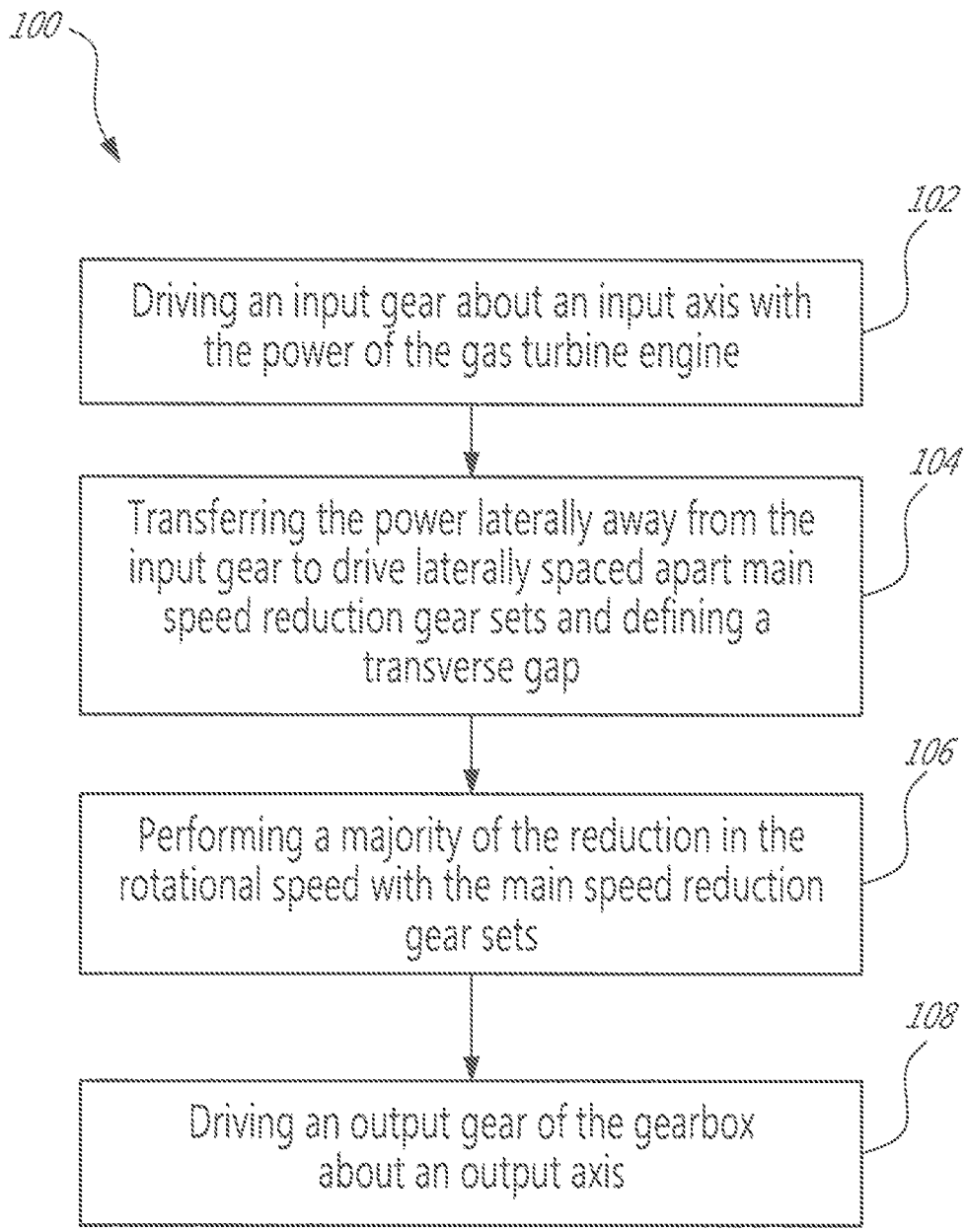

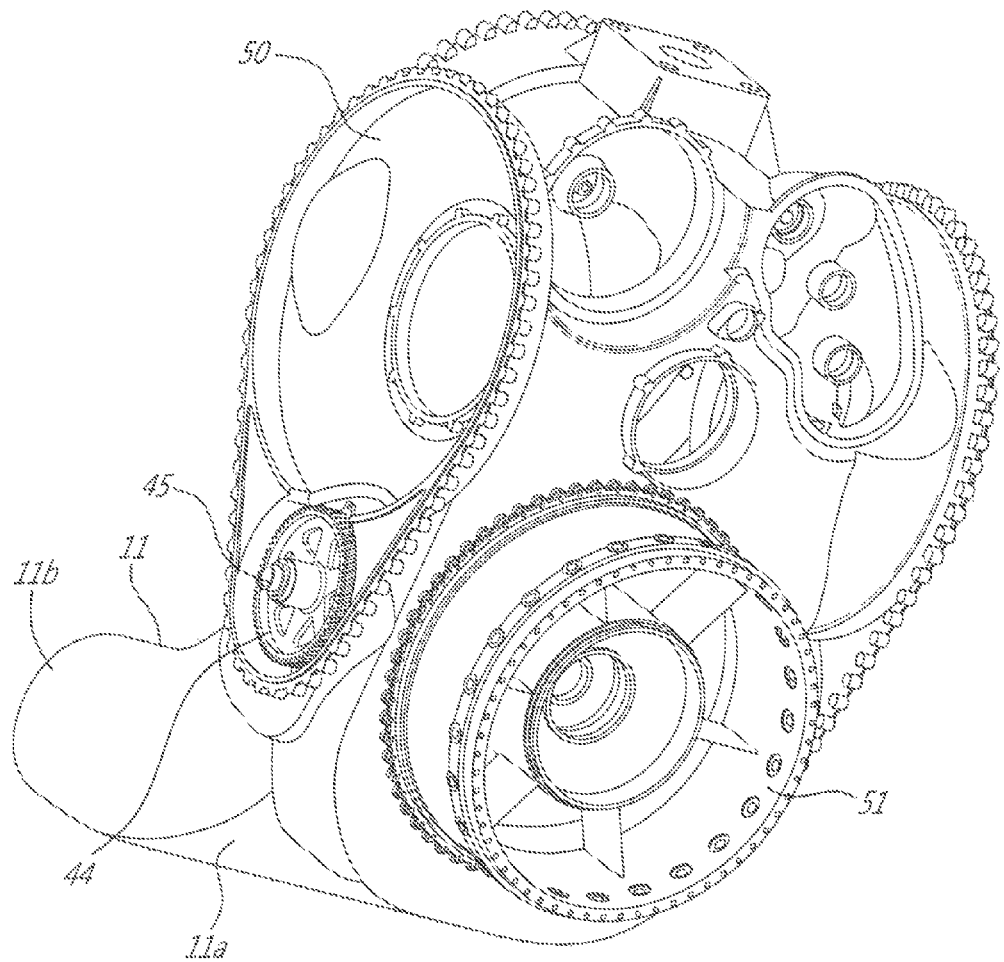

REDUCTION GEARBOX FOR A GAS TURBINE ENGINE

TECHNICAL FIELD

The application relates generally to gas turbine engines and, more particularly, to a reduction gearbox for a gas turbine engine.

BACKGROUND

Gas turbine engines rotate at relatively high speeds. When these engines are used to drive aircraft propellers or rotors, which generally require low speeds, gear reduction must be used. A suitable gearbox, such as a reduction gearbox, links the output of the gas turbine engine to the input of the propeller or rotor. More particularly, the reduction gearbox will lower the speed of the output of the gas turbine engine provided to the propeller or rotor.

Reduction gearboxes typically have multiple speed reduction stages, each stage adding to the overall size of the gearbox. High speed gas turbine engines are often used with reduction gearboxes having two or more stages in order to be able to reduce the very high rotational speed of the gas turbine to a relatively low speed for propeller or rotor outputs, the speed reduction being dependent on the gearbox transmission ratio. Such a reduction gearbox can have too large of a space footprint to be accommodated in close proximity to the core of the gas turbine engine. For example, brining such a reduction gearbox in close proximity to the core of the gas turbine engine would bring it in spatial conflict with components such as the air intake. The relatively large separation between the reduction gearbox and the core of the gas turbine engine can lead to larger, and therefore heavier, gas turbine engines.

SUMMARY

In one aspect, there is provided a reduction gearbox for a gas turbine engine for reducing the rotational speed of a turbine output shaft and driving an engine output shaft, comprising a first gear reduction stage having an input gear adapted to be driven by the turbine output shaft about a longitudinal input axis, the input gear transferring power to drive laterally spaced apart input speed gears about at least one transversely extending gear axis, each said input speed gear engaging an output speed gear to form a main speed reduction gear set, each main speed reduction gear set being spaced laterally from the longitudinal input axis of the input gear on opposed sides thereof to define a transverse gap therebetween, the engaged input and output speed gears of the main speed reduction gear set performing a majority of the reduction in the rotational speed of the turbine output shaft.

In another aspect, there is provided a method for reducing the rotational speed of a turbine output shaft of a gas turbine engine, comprising: driving an input gear of a gearbox about a longitudinal input axis with the turbine output shaft; transferring the power received by the input gear to drive laterally spaced apart main speed reduction gear sets about at least one transversely extending gear axis, each main speed reduction gear set being spaced laterally from the longitudinal input axis on opposed sides thereof to define a transverse gap therebetween; performing a majority of the reduction in the rotational speed of the turbine output shaft with the main speed reduction gear sets; and driving an output gear of the gearbox about an output axis with the power from the main speed reduction gear sets.

There is also provided a reduction gearbox for a gas turbine engine for reducing the rotational speed of a turbine output shaft and driving an engine output shaft, comprising: a first gear reduction stage having an input gear adapted to be driven by the turbine output shaft about a longitudinal input axis, the input gear transferring power to drive laterally spaced apart input speed gears about at least one transversely extending gear axis, each said input speed gear engaging an output speed gear to form a main speed reduction gear set, each main speed reduction gear set being spaced laterally from the longitudinal input axis of the input gear on opposed sides thereof to define a transverse gap therebetween, the engaged input and output speed gears of the main speed reduction gear set performing a majority of the reduction in the rotational speed of the turbine output shaft; and a second gear reduction stage driven by the output speed gears of the first gear reduction stage, the second stage adapted to drive the engine output shaft.

In yet another aspect, there is provided a turboprop gas turbine engine, comprising: a compressor section, a combustor, and a turbine section arranged in serial flow communication, the turbine section driving a turbine output shaft; a reduction gearbox disposed at the forward end of the engine, comprising: a first gear reduction stage having an input gear driven by the turbine output shaft, the input gear engaging at least two laterally spaced apart transfer gears that split power received from the turbine output shaft, each transfer gear mounted to an input transmission shaft extending laterally away from a corresponding transfer gear to an input speed gear mounted at a laterally outer end thereof, each input speed gear engaging an output speed gear, each engaged pair of the input speed gear and the output speed gear lying in a plane, the planes being parallel and disposed on opposed sides of the gearbox and laterally spaced apart from one another to define a gap therebetween; and a second gear reduction stage driven by the output speed gears, the second stage driving an output shaft adapted to transmit power to a propeller; and an air intake disposed upstream of the compressor section at a forward end of the engine, the air intake having a hollow body extending between an inlet and an outlet, the outlet being connected in fluid flow communication with the compressor section to supply inlet air thereto, the body being at least partially disposed within the gap defined by the gearbox and housing at least the input gear and the transfer gears between the inlet and the outlet of the body.

The above-described turboprop gas turbine engine may further include a transmission shaft housing covering each input transmission shaft, each transmission shaft housing having the shape of an airfoil with a leading edge facing toward the inlet of the air intake, and a trailing edge facing toward the outlet of the air intake. The input gear of the above-described turboprop gas turbine engine may be an input bevel gear rotatable with the input shaft about an input axis, and each transfer gear a first bevel gear engaging the input bevel gear, each input speed gear rotatable about a same gear axis as a corresponding first bevel gear. The gear axes of each pair of the first bevel gear and the input speed gear may be collinear. Each output speed gear may be mounted to an output transmission shaft extending laterally inwardly from a corresponding output speed gear to second bevel gear mounted at a laterally inner end thereof. The second bevel gears may engage an output bevel gear, the output bevel gear being rotatable about an output axis. Each of the gear axes may be non-parallel to both the input axis and the output axis, the input and output axes being parallel. Each plane may be oriented vertically on opposed sides of the gearbox.

BRIEF DESCRIPTION OF THE DRAWINGS

Reference is now made to the accompanying figures in which:

FIG. 2 is a perspective view of the reduction gearbox of FIG. 1;

FIG. 3 is a schematic cross-sectional view of the reduction gearbox of FIG. 1 placed within an engine nacelle;

FIG. 4 is a diagram of a method for conveying power from a gas turbine engine;

FIG. 5C is a perspective view of the components of FIG. 5B being disposed within the air intake of FIG. 5A.

DETAILED DESCRIPTION

Figure 1:
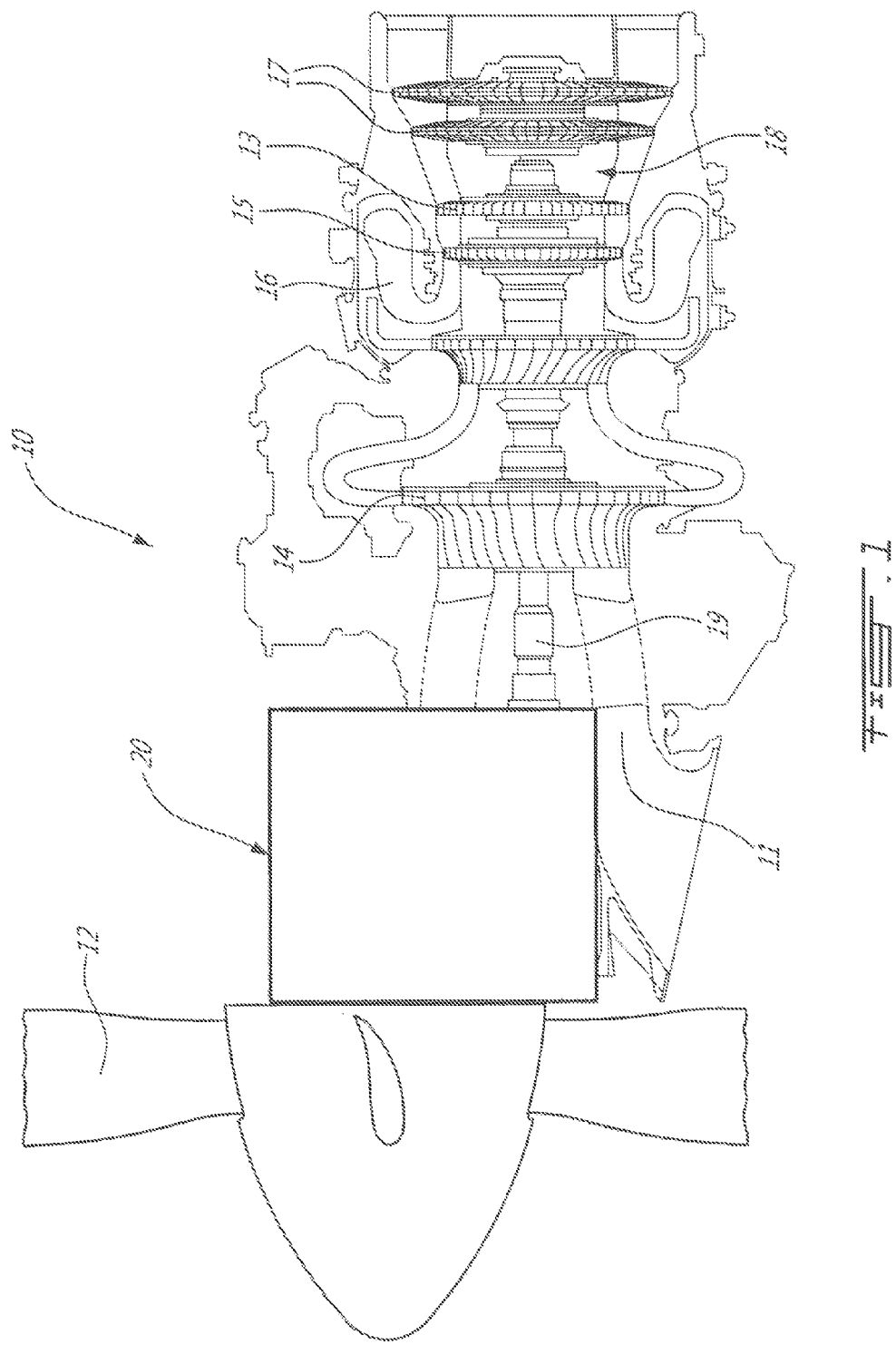
FIG. 1 is a partial cross-sectional view of a gas turbine engine having a reduction gearbox of the present disclosure shown schematically.

FIG. 1 illustrates generally a gas turbine engine 10 of a type preferably provided for use in subsonic flight, generally comprising in serial flow communication an air intake 11 through which ambient air enters the engine 10, a compressor section 14 for pressurizing the air, a combustor 16 in which the compressed air is mixed with fuel and ignited for generating an annular stream of hot combustion gases, and a turbine section 18 for extracting energy from the combustion gases.

The engine of FIG. 1 is more particularly a turboprop engine 10, which has an reduction gearbox 20 for driving a propeller 12. It will be appreciated that the engine 10 may also be a turboshaft engine for driving a main and tail rotor of a helicopter, for example. The turbine section 18 of the engine 10 can include a low pressure (LP) turbine 13, a high pressure (HP) turbine 15, and one or more power turbines 17 which drive a power turbine output shaft 19. The turbine output shaft 19 provides rotational input into the reduction gearbox 20. The turbine output shaft 19 provides rotational input directly to the reduction gearbox 20 in most instances. The turbine output shaft 19 may also drive a drive shaft 23 (see FIG. 3).

The reduction gearbox 20 reduces the speed of the power turbine 17 to one suitable for the propeller 12. The gearbox can either be a "standard rotation" gearbox 20 or an "opposite rotation" gearbox 20, depending on the desired direction of rotation for the propeller 12. As will explained in more detail below, the gearbox 20 includes more than one stage of speed reduction.

Referring to FIGS. 1 and 2, the gearbox 20 includes a first stage 26 of speed reduction which receives a rotational input from the turbine output shaft 19 of the power turbine. The first stage 26 employs gear reduction to lower the rotational speed received from the turbine output shaft 19. The gearbox 20 also includes a second stage 25 of speed reduction which receives a lower speed rotational input from the first stage 26. The second stage 25 employs additional gear reduction to the input received from the first stage 26 to further lower speed. The second stage 25 provides a rotational output to an engine output shaft 21, which can be connected to a propeller or rotor to generate propulsion.

Referring now to FIG. 2 in greater detail, the first stage 26 receives rotational power directly from the engine via the turbine output shaft rotating about a longitudinal input axis 24. The first stage 26 is the first speed reduction stage of the gearbox 20. In operation, it lowers the speed of the rotational input received from the engine. The first stage 26 then outputs a lower speed rotational output to the second stage 25. The first stage 26 therefore engages, directly or indirectly, both the turbine output shaft 19 and the second stage 25. The first stage 26 has an input gear 27 receiving power from the turbine output shaft 19 and rotating about the input axis 24, an output gear 28 rotating about an output axis 22, and a speed reduction gear set 40 transferring rotational drive from the input gear 27 to the output gear 28. The input gear 27 receives the power of the engine via the turbine output shaft 19, and directs it to the speed reduction gear set 40. The input gear 27 can be connected to the turbine output shaft 19 or mounted thereabout so as be in a fixed rotational relationship with the turbine output shaft 19. The input gear 27 therefore rotates at the same speed as the turbine output shaft 19 and about the input axis 24.

Referring now to FIGS. 2 and 3, the speed reduction gear set 40 of the first stage 26 engages both the input gear 27 and the output gear 28 to connect them together via a speed reduction gear train. The speed reduction gear set 40 is responsible for the majority of the speed reduction achieved by the first stage 26. As will be discussed in greater detail below, some of the components of the speed reduction gear set 40 are located on opposed sides of the gearbox 20, and thus create space in the interior of the gearbox 20. Because of the open space created within its confines, the gearbox 20 can be brought closer to the engine core without interfering with critical engine parts.

The speed reduction gear set 40 includes two input gear sets 42, each of which engages the input gear 27, which is generally a bevel gear. Each input gear set 42 receives approximately half of the power received from the engine by the input gear 27, and directs the rotational output laterally away from the input gear 27 along each of their respective gear axes 41. Indeed, the gear axes 41 of each input gear set 42 may be collinear.

Each input gear set 42 has transfer gears 43, which are also generally bevel gears, each of which meshes with the input bevel gear 27 and is driven thereby. The transfer gears 43 are laterally spaced apart. The term "lateral" and its derivatives as used herein describe a transverse direction which is toward and away from the sides of the gearbox 20 or its housing. The lateral direction can be contrasted with the longitudinal direction, which is lengthwise direction of the gearbox 20 and engine.

Two meshing bevel gears will change the direction of the rotational drive. More particularly, the input bevel gear 27 will provide the rotational drive about the input axis 24, and the meshing bevel transfer gears 43 will output the rotational drive about each of their respective gear axes 41. Furthermore, the two transfer gears 43 share a common pinion (i.e. the input bevel gear 27), which causes the power from the engine to be halved by each transfer gear 43, provided that the bevel gears have a transmission ratio of approximately one. The engagement of the transfer gears 43 with the input bevel gear 27 also contributes to reducing the size of the gearbox 20. Each of the bevel gears can be made sufficiently small to fit inside the air intake, thereby reducing the space occupied by the gearbox 20 without forming excessive obstacles to the air flowing into the air intake.

Each of the input gear sets 42 also has an input transmission shaft 45, which transmits the rotational drive from each transfer gear 43 laterally away from an interior of the gearbox 20 to an input speed gear 44 located on an outer side of the gearbox 20 (i.e. away from a center of the gearbox 20). Each input speed gear 44 is mounted to the input transmission shaft 45 at a laterally outer end and rotates about the same gear axis 41 as the transfer gear 43 to which it is linked. As will be discussed below, each input speed gear 44 forms part of the main speed reduction of the first stage 26 so as to reduce the speed of the rotational output from the engine. As such, each input speed gear 44 can be any suitable helical or spur pinion which accomplishes such functionality.

The speed reduction gear set 40 also includes two output gear sets 46. Each output gear set 46 receives approximately half of the engine power from a corresponding input speed gear 44, and lowers the speed of the rotational output about each of their respective gear axes 41. Indeed, the gear axes 41 of each output gear set 46 may be collinear.

Each output gear set 46 has an output speed gear 48 which meshes with the input speed gear 44 of a corresponding input gear set 42 and is driven thereby. Each output speed gear 48 lies in the same plane 53 as the input speed gear 44 with which it is engaged. One of these planes 53 is lying in the page of FIG. 3. Each plane 53 is located at an outer, lateral side of the gearbox 20, and thus away from the center of the gearbox 20. The two planes 53 are parallel to one another and laterally spaced apart from one another, and from the center of the gearbox 20, to define a transversely extending gap G between the planes 53. When the central longitudinal axis of the engine is oriented parallel to the ground surface, the planes 53 may have a substantially vertical orientation (see FIG. 3), or perpendicular to the ground surface.

By engaging the input speed gears 44, each output speed gear 48 lowers the speed of the rotational output of the engine. Therefore, each input speed gear 44 engaged with an output speed gear 48 forms part of a main speed reduction gear set, which accomplishes the majority of the reduction in the rotational speed received from the input gear 27. More particularly, the output speed gear 48 has a larger operational diameter (and greater number of teeth) than that of the input speed gear 44 with which it is meshed, such that the output speed gear 48 will have a lower rotational frequency. It will be appreciated that the relative size of the input speed gear 44 and the output speed gear 48 can vary, however the output speed gear 48 will always be larger than the input speed gear 44 in order to achieve speed reduction. Each of the output gear sets 46 also has an output transmission shaft 49, which transmits the rotational drive from each output speed gear 48 laterally inward toward the center of the gearbox 20 and toward a second bevel gear 47. Each second bevel gear 47 rotates about the same gear axis 41 as the output speed gear 48 to which it is linked via the output transmission shaft 49.

It can thus be appreciated from the above that the input gear set 42 and the output gear set 46 of the first stage 26 are vertically offset (i.e. offset in a plane that is perpendicular to the main longitudinal engine axis) and "out of plane" with one another. This allows the input and output gear sets 42,46 to be "stacked" atop one another. This vertical offset of the speed reduction in the first stage 26 also allows the input axis 24 and the output axis 22 to be vertically offset from each other.

The output gear 28 of the first stage 26 receives a lower speed rotational input from the speed reduction gear set 40. The output gear 28 also engages the second stage 25 to provide rotational drive from the first stage 26 to the second stage 25. The nature of the engagement of the output gear 28 with the second stage 25 can vary. For example, the output gear 28 can be coupled to one of the gears of the second stage 25 via a spline.

In order to change the direction of the lower speed rotational output from the output gear set 46 so that it rotates about the output axis 22 to drive the second stage 25, the output gear 28 can be a bevel gear. The output bevel gear 28 rotates about the output axis 22. The output bevel gear 28 must mesh with another bevel gear, such as each of the second bevel gears 47 of the output gear sets 46. As the second bevel gears 47 engage the output bevel gear 28, the power from the engine is recombined at the output bevel gear 28, and outputted about the output axis 22 to the second stage 25. The output bevel gear 28 therefore directs the rotational output of the first stage 26 about the output axis 22. The output bevel gear 28 can therefore be any suitable bevel gear, such as a mitre gear, a spiral bevel gear, or a hypoid gear which allows for recombining the rotational input received from the speed reduction gear set 40.

It can thus be appreciated from the above that each of the gears in the speed reduction gear set 40 rotates about its own gear axis 41. Each of the gear axes 41 is oriented non-parallel to the input axis 24 and to the output axis 22. In the depicted embodiment, each gear axes 41 is perpendicular to both the input axis 24 and the output axis 22, as shown in FIG. 2. However, the gear axes 41 of speed reduction gear set 40 may also be inclined at an angle (i.e. a non-zero angle) to the input and output axes 24,22. The expression "non-parallel" can be better appreciated by assuming that each of the gear axes 41 and the input and output axes 24,22 lie in their own vertical plane. The vertical plane of any one of the gear axes 41 is not parallel to, and indeed may intersect, the vertical plane of each of the input axis 24 and the output axis 22. In the embodiment of FIG. 2, for example, the vertical plane of each gear axis 41 intersects perpendicularly both vertical planes of the input axis 24 and the output axis 22.

The non-parallel orientation of the gear axes 41 with respect to the input and output axes 24,22 can be achieved in a number of ways. In the embodiment of FIG. 2, the speed reduction gear set 40 splits and recombines the power received from the engine. More particularly, the input gear 27 is a bevel gear or pinion which rotates with the turbine output shaft 19 about the input axis 24. Since the input bevel gear 27 will necessarily mesh with another bevel gear, the power supplied by the engine is fractioned by the two bevel transfer gears 43 which mesh with the input bevel gear 27. The rotational output from the engine is received about the input axis 24, and is outputted by the input bevel gear 27 along a direction that is parallel to the gear axes 41. The input bevel gear 27 can therefore be any suitable bevel gear, such as a mitre gear, a spiral bevel gear, or a hypoid gear which allows for fractioning the rotational input received from the turbine output shaft 19.

The second stage 25 of the gearbox 20 is another of the speed reduction stages in the gearbox 20. It receives a rotational input from the first stage 26, via the output gear 28, and lowers the speed thereof before outputting a rotational drive, directly or indirectly, to the engine output shaft 21, and therefore ultimately to the propeller or rotor. The second stage 25 can therefore include any arrangement of gears or a gear train which achieves such functionality.

In the embodiment of FIGS. 2 and 3, the second stage 25 includes a planetary gear train. The planetary gear train can be epicyclical, and may consist of a sun gear 30, coaxial with the engine output shaft 21 about the output axis 22, and coupled to a rotating component of the first stage 26 by a free spline 31 to be driven thereby. The sun gear 30 can be meshed with a plurality of planet gears 32 supported on a planet carrier 33. The planet carrier 33 can be coupled to the engine output shaft 21 by a fixed spline coupling to drive the engine output shaft 21. A stationary outer ring gear may be meshed with the planet gears 32 to allow an orbiting motion about the sun gear 30. Alternatively, the planet carrier 33 may be stationary and the outer ring gear may rotate to output power.

The engine output shaft 21 driven by the gearbox 20 receives the rotational output of the second stage 25 and engages the propeller or rotor, or a shaft thereof, to provide rotational power thereto. The engine output shaft 21 can be connected directly to the propeller shaft by joining abutting flanges on both shafts, or indirectly via another component. As an elongated body, the engine output shaft 21 defines the output axis 22, and is rotatable thereabout.

Still referring to FIGS. 2 and 3, the gearbox 20 may include one or more accessory drives for driving accessories of the engine (e.g. fuel pump, cabin air compressor, etc.). These accessories are driven by the power supplied by the engine. The first stage 26 is typically more suitable for driving these engine accessories than the second stage 25. The gearbox 20 may therefore have an accessory drive gear 29 driven by the output gear 28 about the output axis 22. The accessory drive gear 29 is coaxial with the output gear 28. The accessory drive gear 29 may there be mounted onto the output gear 28 to rotate therewith. The accessory drive gear 29 may, engage with idlers or other similar components to transmit power to the accessories.

It can thus be appreciated from the above, and with reference to FIG. 3 more particularly, that the gearbox 20 disclosed herein may have a configuration which allows it to be placed closer to the core of engine 10 than existing multi-stage reduction gearboxes, because the gearbox 20 can be driven directly by the turbine output shaft 19. There is therefore no need for a separate drive shaft 23 which link the turbine output shaft 19 to the gearbox, as is the case with some conventional reduction gearboxes. The drive shaft 23 can therefore be eliminated, or reduced in length, consequently reducing the axial lengthwise distance separating the propeller from the engine. By enabling a shorter drive shaft 23 length when compared to conventional reduction gearboxes (or by allowing a direct connection of the gearbox 20 to the turbine output shaft 19, thus eliminating the need for the drive shaft 23 altogether), the gearbox 20 can contribute to making the gas turbine engine and the surrounding nacelle shorter and lighter. The gearbox 20 allows for the integration of critical parts, such as the air intake, within its confines, thus allowing its closer proximity to the core of engine 10.

Referring now to FIG. 4, there is also disclosed a method 100 for conveying power of a gas turbine engine using the above-described reduction gearbox.

The method 100 includes driving, by rotational motion, an input gear of a gearbox about an input axis, shown as 102 in FIG. 4. The rotational motion is provided by power from the gas turbine engine. The power may be supplied directly to the gearbox via a turbine output shaft of the gas turbine engine.

The method 100 also includes transferring the power received by the input gear to drive laterally spaced apart main speed reduction gear sets about one or more transversely extending gear axes. Each main speed reduction gear set is spaced laterally from the longitudinal input axis on opposed sides thereof so as to define a transverse gap, shown as 104 in FIG. 4.

This includes splitting the power of the gas turbine engine in half. The gear axes of the transfer gears are collinear, and non parallel to the input axis and to the output axis. The split power from the engine can then be recombined and provided to the engine output shaft.

The method 100 also includes performing a majority of the reduction in the rotational speed of the turbine output shaft with the main speed reduction gear sets, shown as 106 in FIG. 4.

The method 100 also includes driving an output gear of the gearbox about an output axis with the power from the speed reduction gear sets, shown as 108 in FIG. 4.

Figure 5A:
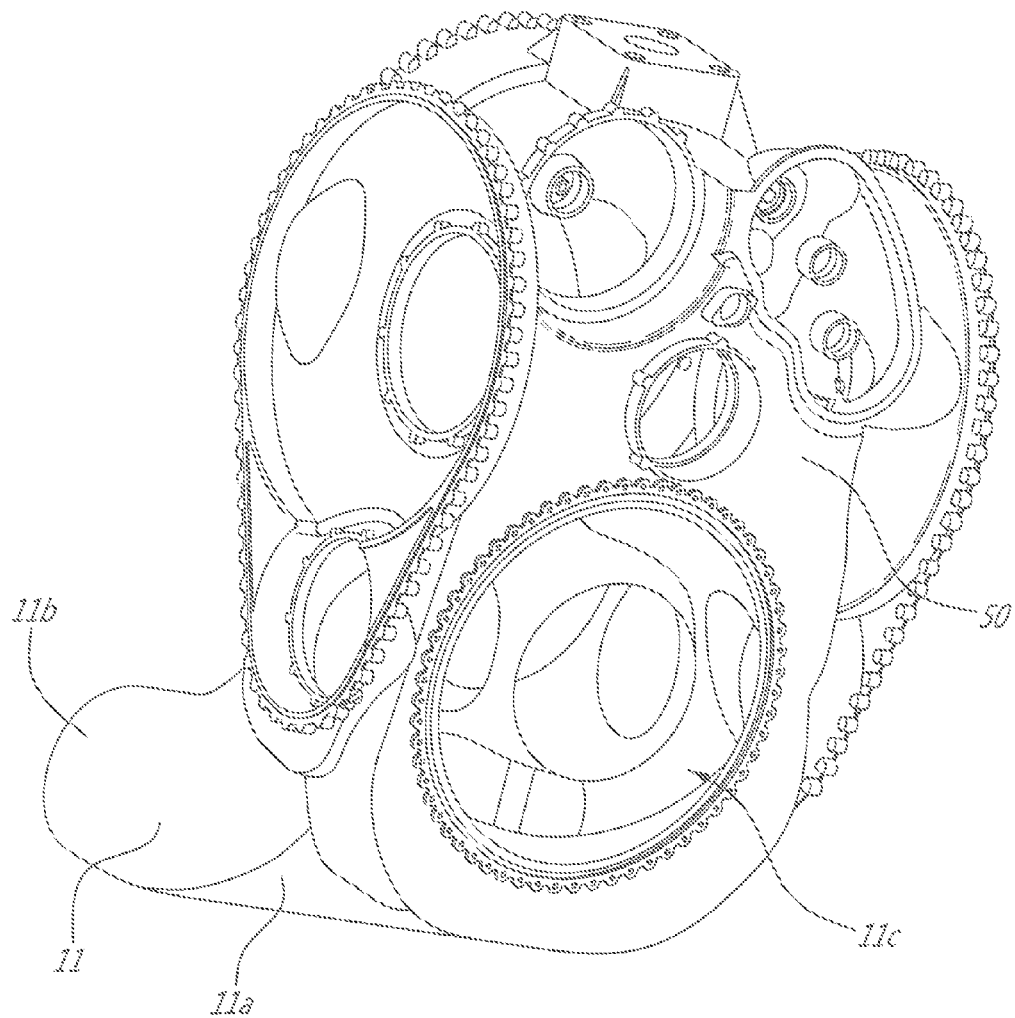
FIG. 5A is a perspective view of a casing and air intake for the reduction gearbox of FIG. 1.

Referring now to FIG. 5A, and according to another embodiment of the present disclosure, some features of the gearbox are housed within a component of the engine, such as the air intake 11. Stated differently, a component of the engine, such as the air intake 11, can be integrated with, in and/or around the gearbox. In housing some of the gearbox within the air intake 11, or enabling the air intake to extend at least partially through and/or between the structure of the gearbox, it is possible to bring the gearbox closer to the turbomachinery of the engine. This helps to shorten the overall axial length of the engine, and thus make the gas turbine engine and the surrounding nacelle shorter and lighter.

FIG. 5A shows a casing 50 of the gearbox (the gearbox itself not being shown for clarity) capable of housing both the first and second stages of the gearbox. The casing 50 is mounted to the engine forward of the compressor section. The air intake 11 is connected to an upstream, or forward end, of the casing 50 and is configured to bring air into the compressor section of the engine via the interior of the casing 50. The air intake 11 has a hollow body 11*a* which extends between an inlet 11*b* and an outlet 11*c*. Air is brought into the body 11*a* via the inlet 11*b*, and exits the body 11*a* via the outlet 11*c*.

Figure 5B:
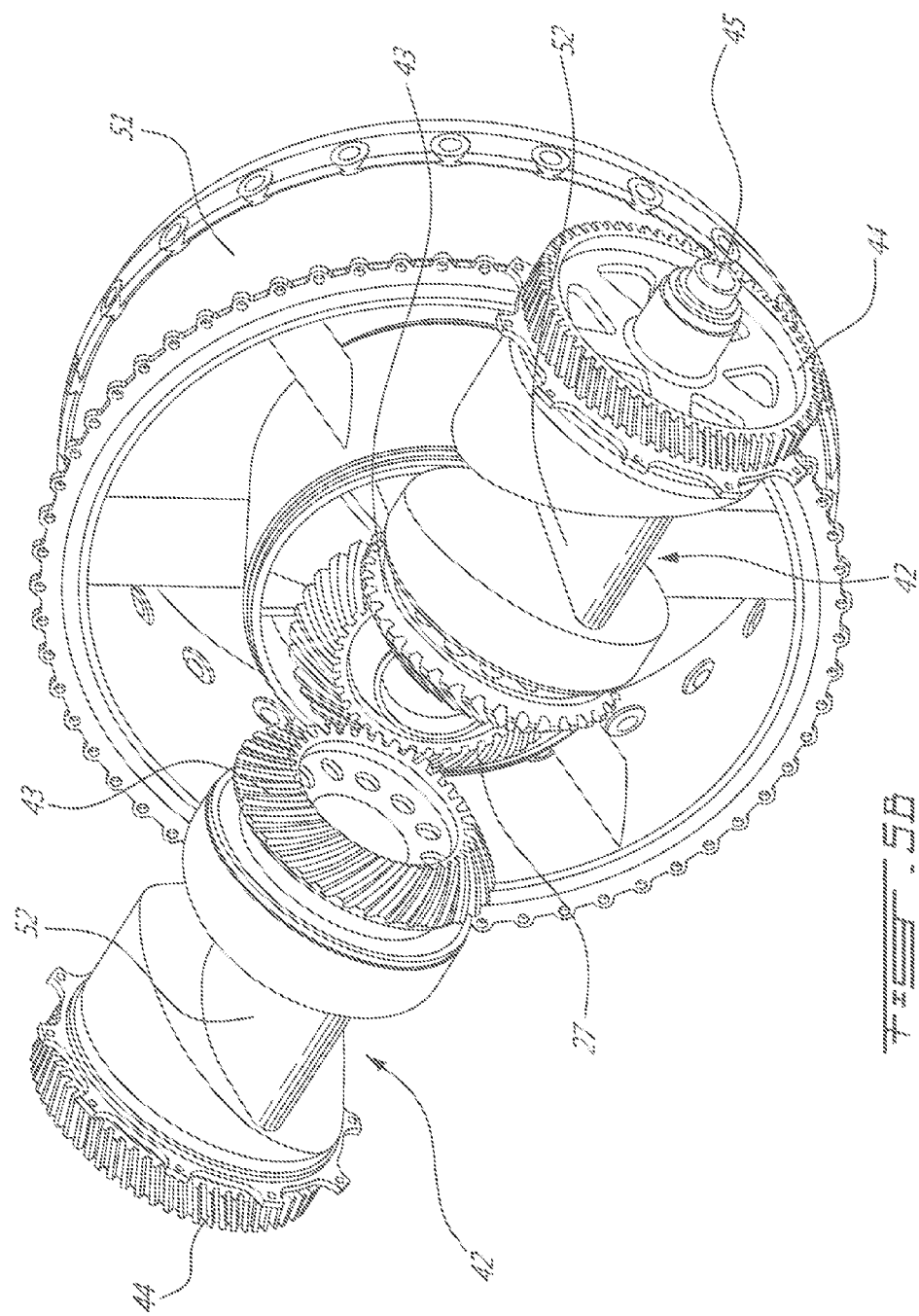
FIG. 5B is a perspective view of components of a first stage of the reduction gearbox of FIG. 1.

Reference is made to FIG. 5B, which shows part of the first stage of the gearbox. More particularly, FIG. 5B shows the input gear 27 engaged with two input gear sets 42. In the current embodiment, the input gear 27 is directly mounted onto the turbine output shaft, either directly or indirectly via another component such as a drive shaft or a gear. In an alternative embodiment, the input gear 27 can be mounted directly to a drive shaft driven by the turbine output shaft. This drive shaft can be of a shorter length than conventional drive shafts because of the reasons given above.

The input gear 27 engages the transfer gears, such as the two transfer gears 43 shown, thereby splitting the power received from the turbine output shaft in half. This split power can then be directed from the transfer gears to the input speed gears 44 via the input transmission shafts 45. The turbine output shaft support the input gear 27, and a front bearing of the turbine output shaft can be mounted to a frame 51, which is itself intended to be mounted to the outlet of the air intake.

The splitting of the power received from the turbine output shaft causes the power to be directed away from the input gear 27. The input gear 27 meshes with two identical transfer gears 43, each with a transmission ratio of one. This allows the input drive gears (i.e. at least the input gear 27 and the transfer gears 43) to be sufficiently small to be integrated within the air intake. The power is directed from the input drive gears to the gears and gear arrangements, such as the input speed gears 44 and the output speed gears 48, which perform the speed reduction of the first stage. The speed reduction performed by the first stage can therefore be moved away from the input gear 27, to the outer confines of gearbox, and thus avoid the air intake. In moving the speed reduction away from the input gear 27, the "input gears" of the first stage (i.e. at least the input gear 27 and the transfer gears) occupy less space, such that they can fit within the air intake.

This is more clearly shown in FIG. 5C. The input gear is disposed within the body 11a of the air intake 11 (and thus hidden from view) between the inlet 11b and the outlet. The transfer gears which engage the input gear are also disposed within the body 11a of the air intake 11 (and thus also hidden from view). The transfer gears split the power received from the input gear and direct it toward the input speed gears 44, which will engage with the output speed gears and perform speed reduction. The prime function of the output speed gears 48 is to perform speed reduction between the (lower) transfer gears 43 and the (upper) second bevel gears 47. Since most of the speed reduction is achieved by these helical gears, the bevel gears can be as compact as possible.

It can thus be appreciated that the displacement of the speed reduction in the first stage toward the outer extremities of the gearbox casing 50 creates an open space within its volume, such that components of the engine, such as the air intake 11, can be integrated within the confines of the gearbox. The input gear and the transfer gears will therefore occupy a relatively small amount of space within the air intake 11, thereby minimising the obstruction of air flowing through the air intake 11. The first stage can further minimise obstruction of the air flow path by housing each input transmission shaft 45 in a transmission shaft housing 52 (see FIGS. 5A and 5B). Each transmission shaft housing 52 may have the shape of an airfoil, with a leading edge facing toward the inlet 11b of the air intake 11, and a trailing edge facing toward the outlet 11c of the air intake 11.

The first stage gear reduction of some conventional reduction gearboxes consists of an input gear meshing with a speed reduction gear having a larger diameter. The larger speed reduction gear is sometimes vertically offset from the input gear. Power is transmitted from the input gear directly to the speed reduction gear without any splitting, and both gears rotate about parallel axes. It will be appreciated that such an arrangement of the first stage gears, which concentrates speed reduction around the input gear, would not be able to fit within a conventional air intake. A reduction gearbox having such a first stage must therefore be mounted forward of the air intake so as not to obstruct flow thereto, thereby necessitating a relatively long drive shaft from the turbo machinery which will result in a relatively long engine along the axial direction.

It is to be appreciated that the embodiment of FIGS. 5A-5C pertains to a turboprop type gas turbine engine architecture wherein both the gearbox and the air intake are located at the forward end of the engine. In other types of gas turbine engines which do not have an air intake at the same end as the gearbox, the gearbox of the present disclosure still helps reduce the overall space envelope, and thus weight, of the engine, however the gearbox simply is not integrated directly within the air intake as per the embodiment of FIGS. 5A-5B.

The above description is meant to be exemplary only, and one skilled in the art will recognize that changes may be made to the embodiments described without departing from the scope of the invention as claimed. Still other modifications which fall within the scope of the present invention will be apparent to those skilled in the art, in light of a review of this disclosure, and such modifications are intended to fall within the appended claims.

The invention claimed is:

1. A reduction gearbox for a gas turbine engine for reducing the rotational speed of a turbine output shaft and driving an engine output shaft, comprising a first gear reduction stage having an input gear adapted to be driven by the turbine output shaft about a longitudinal input axis, the input gear transferring power to drive laterally spaced apart input speed gears about at least one transversely extending gear axis, each said input speed gear engaging an output speed gear to form a main speed reduction gear set, each main speed reduction gear set being spaced laterally from the longitudinal input axis of the input gear on opposed sides thereof to define a transverse gap therebetween, the engaged input and output speed gears of the main speed reduction gear set performing a majority of the reduction in the rotational speed of the turbine output shaft.

2. The reduction gearbox of claim 1, further comprising a second gear reduction stage driven by the output speed gears of the first gear reduction stage, the second stage adapted to drive the engine output shaft.

3. The reduction gearbox of claim 2, wherein the second gear reduction stage comprises a planetary gear train.

4. The reduction gearbox of claim 1, wherein the output speed gear of each main speed reduction gear set has a diameter greater than a diameter of the corresponding input speed gear.

5. The reduction gearbox of claim 1, wherein the transverse gap is shaped and sized between each main speed reduction gear set to receive therein an engine component.

6. The reduction gearbox of claim 5, wherein the engine component is an air intake.

7. The reduction gearbox of claim 6, wherein at least the input gear is disposed within the air intake.

8. The reduction gearbox of claim 1, wherein each main speed reduction gear set lies in a vertical plane on opposed sides of the input gear, the planes being parallel and equally spaced apart on opposed sides of the reduction gearbox.

9. The reduction gearbox of claim 1, wherein the input gear is an input bevel gear rotatable about the input axis.

10. The reduction gearbox of claim 9, wherein the input gear engages two transfer gears to transfer power to drive the laterally spaced apart input speed gears, each transfer gear being a first bevel gear engaging the input bevel gear, each input speed gear rotatable about the same gear axis as a corresponding first bevel gear.

11. The reduction gearbox of claim 9, wherein each output speed gear is mounted to an output transmission shaft extending laterally inwardly from a corresponding output speed gear to a second bevel gear mounted at a laterally inner end thereof.

12. The reduction gearbox of claim 11, wherein each second bevel gear engages an output bevel gear, the output bevel gear being rotatable about an output axis.

13. The reduction gearbox of claim 12, wherein each of the gear axes is non-parallel to both the input axis and the output axis, the input and output axes being parallel.

14. The reduction gearbox of claim 13, wherein the input axis and the output axis are vertically offset.

15. A method for reducing the rotational speed of a turbine output shaft of a gas turbine engine, comprising:

driving an input gear of a gearbox about a longitudinal input axis with the turbine output shaft;

transferring the power received by the input gear to drive laterally spaced apart main speed reduction gear sets about at least one transversely extending gear axis, each main speed reduction gear set being spaced laterally from the longitudinal input axis on opposed sides thereof to define a transverse gap therebetween;

performing a majority of the reduction in the rotational speed of the turbine output shaft with the main speed reduction gear sets; and driving an output gear of the gearbox about an output axis with the power from the main speed reduction gear sets.

16. The method of claim 15, further comprising integrating the input gear and the transfer gears with an air intake of the gas turbine engine.

17. The method of claim 15, wherein transferring the power includes splitting the power between two transfer gears, each transfer gear directing the power laterally away from the input gear.

18. The method of claim 17, wherein splitting the power includes rotating each transfer gear about a corresponding gear axis being non-parallel to the input axis and to the output axis.

19. The method of claim 15, wherein driving the output gear includes driving a second stage of gear reduction with the output gear, the second stage of gear reduction comprising a planetary gear train.

20. A reduction gearbox for a gas turbine engine for reducing the rotational speed of a turbine output shaft and driving an engine output shaft, comprising:

a first gear reduction stage having an input gear adapted to be driven by the turbine output shaft about a longitudinal input axis, the input gear transferring power to drive laterally spaced apart input speed gears about at least one transversely extending gear axis, each said input speed gear engaging an output speed gear to form a main speed reduction gear set, each main speed reduction gear set being spaced laterally from the longitudinal input axis of the input gear on opposed sides thereof to define a transverse gap therebetween, the engaged input and output speed gears of the main speed reduction gear set performing a majority of the reduction in the rotational speed of the turbine output shaft; and a second gear reduction stage driven by the output speed gears of the first gear reduction stage, the second stage adapted to drive the engine output shaft.

* * * * *